(No Model.)
J. C. HERMAN.
VEHICLE BRAKE.
No. 295,123.   Patented Mar. 11, 1884.
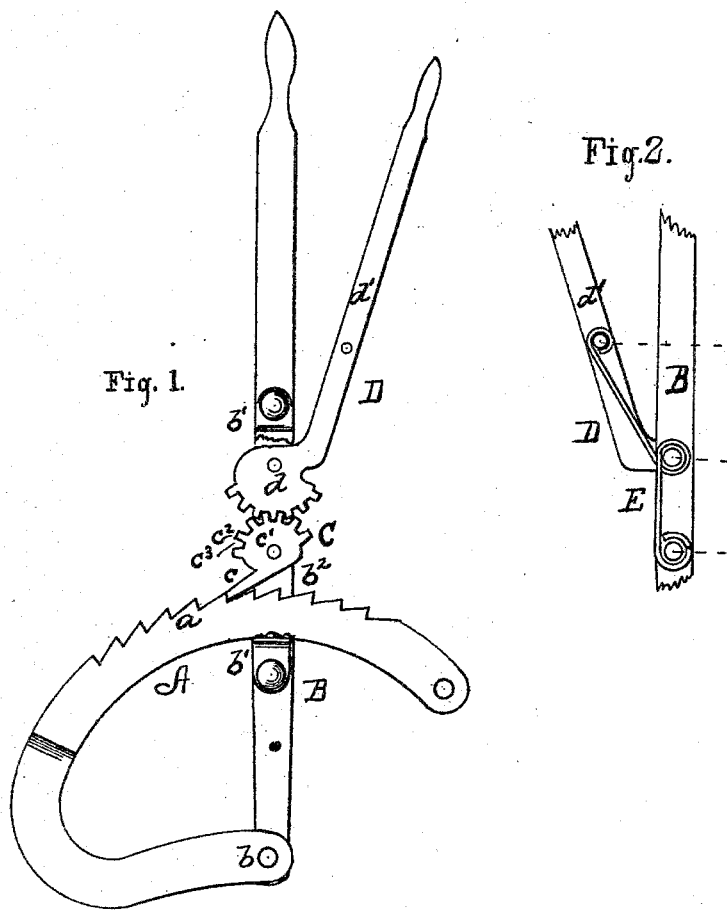
Attest  
Geo. F. Graham  
James N. Redington
Inventor  
John C. Herman  
per Voorhees & Singleton  
Attys.

UNITED STATES PATENT OFFICE.

JOHN C. HERMAN, OF ST. LOUIS, MISSOURI.

VEHICLE-BRAKE.

SPECIFICATION forming part of Letters Patent No. 295,123, dated March 11, 1884.

Application filed October 3, 1883. (No model.)

*To all whom it may concern:*

Be it known that I, JOHN C. HERMAN, of St. Louis and State of Missouri, have invented certain new and useful Improvements in Vehicle-Brakes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side view of the device, showing the gearing. Fig. 2 is a reverse side, showing the spring.

This invention relates to improvements in vehicle-brakes, and has for its object the production of a device with which a slight exertion will operate the pawl even of a heavy brake.

In the annexed drawings, the letter A indicates the ordinary brake-rack, having the teeth $a$. Pivoted at $b$, as usual, is the brake-lever B, passing on one side of the rack A, and having secured to it the strip $b'$, the rack passing between the stem $b^2$ of the lever and the strip. Pivoted between the stem $b^2$ and strip $b'$ is the pawl C. This consists of the finger $c$ and the partial gear $c'$, the latter having the teeth $c^2$ and intermediary notches, $c^3$. Pivoted also between the stem and strip, above the pawl C, is the pawl-operating lever D, consisting of the partial gear $d$, the twin of gear $c'$, and the handle $d'$. This handle D operates, as is readily seen from the drawings, to throw the pawl C from the teeth $a$. A spring, E, operates to move the handle back and keep the pawl against the rack.

The main point of this invention is the use of the gear-connection between the pawl and its lever, whereby the former is quickly and easily operated.

It will be seen that the operating-joint between the pawl C and its lever D is on the line of the brake-lever B; hence there is no leverage off from the lever B, and no tendency to wrench the various portions of the device apart.

I am aware that a brake-lever has been provided with a pawl jointed to such lever, and that this pawl is operated by a notched finger secured at right angles to and projecting from the side of a lever jointed to the main lever below the pawl. In my device the lever and pawl act on each other like wheels of gearing, their centers of rotation being their pivots, which are in the line of the lever B, and the surfaces of the pawl and lever turning on each other. This gives an easy escapement, and very little force is needed to move the parts.

What I claim is—

In a vehicle-brake, the rack A and main lever B, in combination with the pawl C, having the gear $c'$, and the pawl-operating lever D, having the gear $d$, the lever D being pivoted to the lever B above the pawl C, the pivots of the two being in line, and such gears being in the line of the lever B, turning simply on their pivots as centers, and their contracting edges engaging between such pivots, as described, whereby the pawl and lever are operated like a train of gearing, as and for the purpose set forth.

In testimony that I claim the foregoing as my own I affix my signature in presence of two witnesses.

JOHN C. HERMAN.

Witnesses:
J. B. SINGLETON,
G. C. TUCKER.